United States Patent
Noh et al.

(10) Patent No.: US 12,373,048 B2
(45) Date of Patent: Jul. 29, 2025

(54) BUTTON DEVICE ATTACHED TO TOUCH SCREEN, AND ELECTRONIC EQUIPMENT PROVIDED WITH SAME

(71) Applicant: KORTEK CORPORATION, Incheon (KR)

(72) Inventors: Tae Heon Noh, Incheon (KR); Hak Hyun Kim, Incheon (KR); Woo Hwangbo, Yongin-si (KR)

(73) Assignee: KORTEK CORPORATION, Incheon (KR)

( * ) Notice: Subject to any disclaimer, the term of this patent is extended or adjusted under 35 U.S.C. 154(b) by 0 days.

(21) Appl. No.: 18/708,002

(22) PCT Filed: Oct. 7, 2022

(86) PCT No.: PCT/KR2022/015070
§ 371 (c)(1),
(2) Date: May 7, 2024

(87) PCT Pub. No.: WO2023/090639
PCT Pub. Date: May 25, 2023

(65) Prior Publication Data
US 2024/0427441 A1  Dec. 26, 2024

(30) Foreign Application Priority Data

Nov. 18, 2021  (KR) .................. 10-2021-0159557

(51) Int. Cl.
*G06F 3/039* (2013.01)
*G06F 3/02* (2006.01)
(52) U.S. Cl.
CPC .......... *G06F 3/0393* (2019.05); *G06F 3/0202* (2013.01)

(58) Field of Classification Search
CPC ............................ G06F 3/0393; G06F 3/0202
See application file for complete search history.

(56) References Cited

U.S. PATENT DOCUMENTS 12,001,635 B2 *  6/2024  Park ...................... G06F 3/0482
2020/0073513 A1 *  3/2020  Ballan ..................... G06F 3/039
(Continued)

FOREIGN PATENT DOCUMENTS

| KR | 10-2003-0004340 A | 1/2003 |
| KR | 10-2011-0087153 A | 8/2011 |

(Continued)

OTHER PUBLICATIONS

International Search Report for PCT/KR2022/015070 mailed on Jan. 18, 2023.

*Primary Examiner* — Afroza Chowdhury
(74) *Attorney, Agent, or Firm* — Schmeiser, Olsen & Watts LLP

(57) ABSTRACT

A button device attached to a touch screen is provided including: a base adhered and fixed to the surface of the touch screen; a push button which overlaps the base and can be raised and lowered relative to the base, and includes a central portion and a flange portion stepped and expanding outward from the outer boundary of the central portion; a bezel which is placed on the push button so as to expose the central portion and cover the flange portion, and is detachably coupled to the base; and a conductive elastomer which is made of an elastic material that can conduct electricity, is disposed between the base and the flange portion of the push button so as to elastically support the push button in the direction wherein the push button rises, and is provided with a downward protrusion that protrudes downward toward the touch screen.

9 Claims, 6 Drawing Sheets

(56) References Cited

U.S. PATENT DOCUMENTS

2021/0135672 A1 5/2021 Aoki et al.
2022/0004268 A1* 1/2022 Ballan .................. G06F 3/0393

FOREIGN PATENT DOCUMENTS

| KR | 10-1094146 B1 | 12/2011 |
| KR | 10-2017637 B1 | 9/2019 |
| KR | 10-2060257 B1 | 12/2019 |
| KR | 10-2156515 B1 | 9/2020 |
| WO | 2018-193549 A1 | 10/2018 |

* cited by examiner

BUTTON DEVICE ATTACHED TO TOUCH SCREEN, AND ELECTRONIC EQUIPMENT PROVIDED WITH SAME

CROSS-REFERENCE TO RELATED APPLICATIONS

This application is a national application of PCT Application No. PCT/KR2022/015070, having a filing date of Oct. 7, 2022, claiming priority to KR Application No. 10-2021-0159557, having a filing date of Nov. 18, 2021, the entire both contents of which are hereby incorporated by reference.

FIELD OF TECHNOLOGY

The following relates to a touch screen-attached button device that is attached to a capacitive touch screen and allows a specific instruction to be input to the touch screen when pressed, and an electrode device provided with the same.

BACKGROUND

Touch screens are applied to portable electronic devices such as smart phones, smart pads, and laptop computers as well as gaming-dedicated electronic devices such as slot machines, to implement an intuitive and simple user interface. However, when a user plays a game using these electronic devices and the user presses a touch screen to input a specific instruction, there is almost no detection of pressure felt by a hand during the inputting, and thus the interest and tension in the game may decrease. Further, since only a specific portion of the touch screen is repeatedly and strongly pressed, the touch screen may be easily damaged or a malfunction thereof may occur.

Thus, Korean Patent No. 10-2017637 discloses a button device which is installed in the touch screen, to which a specific instruction is input, and wherein a user feels a physical pressure detection when the button device is pressed. However, the button device is installed after a protective glass of a front surface of the touch screen is partially removed or a mounting hole is formed in the protective glass, and the button device and the touch screen are electrically connected using an electric wiring line passing through the mounting hole. Therefore, assembly costs for installing the button device on the touch screen increases, and an assembly takes a long time. Further, liquid or foreign substances may easily flow into the electronic device through a removed portion of the protective glass or the mounting hole, and thus a malfunction thereof may be caused.

The conventional art is disclosed in Korean Patent Registration No. 10-2017637 (registered on Aug. 28, 2019, Title: Button device for casino machine).

SUMMARY

An aspect relates to a touch screen-attached button device that is completely installed by simply attaching the touch screen-attached button device to a touch screen without cutting the touch screen or forming a mounting hole in the touch screen, and an electronic device equipped with the same.

One aspect of embodiments of the present invention provides a touch screen-attached button device including a base fixed to a surface of a touch screen, a push button overlapping the base, disposed to move vertically with respect to the base, and including a central part and a flange part extending from an outer boundary of the central part in a stepped manner, a bezel covered on the push button such that the central part is exposed and the flange part is covered and detachably coupled to the base, and a conductive elastomer made of a conductive elastic material, elastically supporting the push button in an upward direction while interposed between the base and the flange part of the push button, and having a downward protrusion protruding downward toward the touch screen, wherein a downward protrusion through-hole into which the downward protrusion fits is formed in the base, and when the push button is pressed downward, the conductive elastomer is pressed downward, and thus the downward protrusion passes through the downward protrusion through-hole and comes into contact with the surface of the touch screen.

The conductive elastomer may extend along a closed curved path.

The conductive elastomer may be provided with a wrinkle part having a cross section extending along a zigzag path.

The base may be provided with an inclined part of which an upper surface is obliquely lowered from a center toward an edge, and an outer lower end of the conductive elastomer in a width direction may fixedly fit onto the inclined part.

The conductive elastomer may be provided with an outer end wall part spaced apart from the downward protrusion in a width direction and a connection part connecting the downward protrusion and an upper end of the outer end wall part, a support groove may be formed around the downward protrusion through-hole of the base in a stepped manner, and a lower end of the outer end wall part may fixedly fit into the support groove.

The base may be provided with a plurality of hooks protruding upward, and the bezel may be provided with a plurality of interference protrusions mutually interfering with the plurality of hooks such that the bezel is prevented from being unintentionally separated from the base when covered on the push button.

The base may be fixedly adhered to the surface of the touch screen by a double-sided adhesive tape, and an avoidance dent recessed to not close the downward protrusion through-hole may be formed in the double-sided adhesive tape.

The conductive elastomer may include an elastic substrate containing rubber and a metal powder dispersed in the elastic substrate.

Another aspect of embodiments of the present invention provides an electronic device including a touch screen including a protective glass, a plurality of first touch detecting electrodes located below the protective glass and extending in a horizontal direction to be spaced apart from each other, and a plurality of second touch detecting electrodes located below the protective glass and extending in a vertical direction to be spaced apart from each other, and a touch screen-attached button device attached to an upper surface of the protective glass of the touch screen, wherein the touch screen-attached button device includes a base fixed to a surface of the touch screen, a push button overlapping the base, disposed to move vertically with respect to the base, and including a central part and a flange part extending from an outer boundary of the central part in a stepped manner, a bezel covered on the push button such that the central part is exposed and the flange part is covered and detachably coupled to the base, and a conductive elastomer made of a conductive elastic material, elastically supporting the push button in an upward direction while interposed between the base and the flange part of the push button, and having a downward protrusion protruding downward toward the touch screen, a downward protrusion through-hole into which the downward protrusion fits is formed in the base, and, when the push button is pressed downward, the conductive elastomer is pressed downward, and thus the downward protrusion passes through the downward protrusion through-hole and comes into contact with the surface of the touch screen.

A smaller one of a length and a width of the downward protrusion may be greater in size than a larger one of a gap between a pair of adjacent first touch detecting electrodes and a gap between a pair of adjacent second touch detecting electrodes.

According to embodiments of the present invention, a function of transmitting an instruction of a user to a touch screen through pressing of a push button and a function of elastically supporting the push button are performed by a conductive elastomer that is one component. Thus, a structure of a touch screen-attached button device is simple, and thus the reliability of operation is improved, the possibility of failure such as a malfunction is reduced, and product costs are reduced.

According to the touch screen-attached button device according to an exemplary embodiment wherein the conductive elastomer fits onto an inclined part of a base, even when liquid foreign substances penetrate into the touch screen-attached button device, the liquid foreign substances do not remain therein, are easily discharged to the outside, and do not flow into a hollow of the base or a downward protrusion through-hole. Thus, a problem that operation failures occur due to the penetration of the liquid foreign substances or an image viewed through a central part of the push button is blocked does not occur.

According to an electronic device of embodiments of the present invention, which includes a touch screen-attached button device that is fixedly adhered to a surface of a protective glass of a touch screen without damaging the protective glass, assembly costs for installing a button device on the touch screen are reduced, and an assembly time therefor is shortened. Further, since the liquid foreign substances do not flow into the electronic device through a damaged part of the protective glass, internal contamination of the electronic device or a malfunction resulting therefrom is prevented.

BRIEF DESCRIPTION

Some of the embodiments will be described in detail, with references to the following Figures, wherein like designations denote like members, wherein.

DETAILED DESCRIPTION

Hereinafter, a touch screen-attached button device and an electronic device equipped with the same according to embodiments of the present invention will be described in detail with reference to the accompanying drawings. Terms used in the specification are used to properly express the embodiments of the present invention or and the terms may change depending on the intention of a user or an operator or customs in the field to which embodiments of the present invention belongs. Therefore, definitions of these terms should be made based on the contents throughout the specification.

Figure 1:
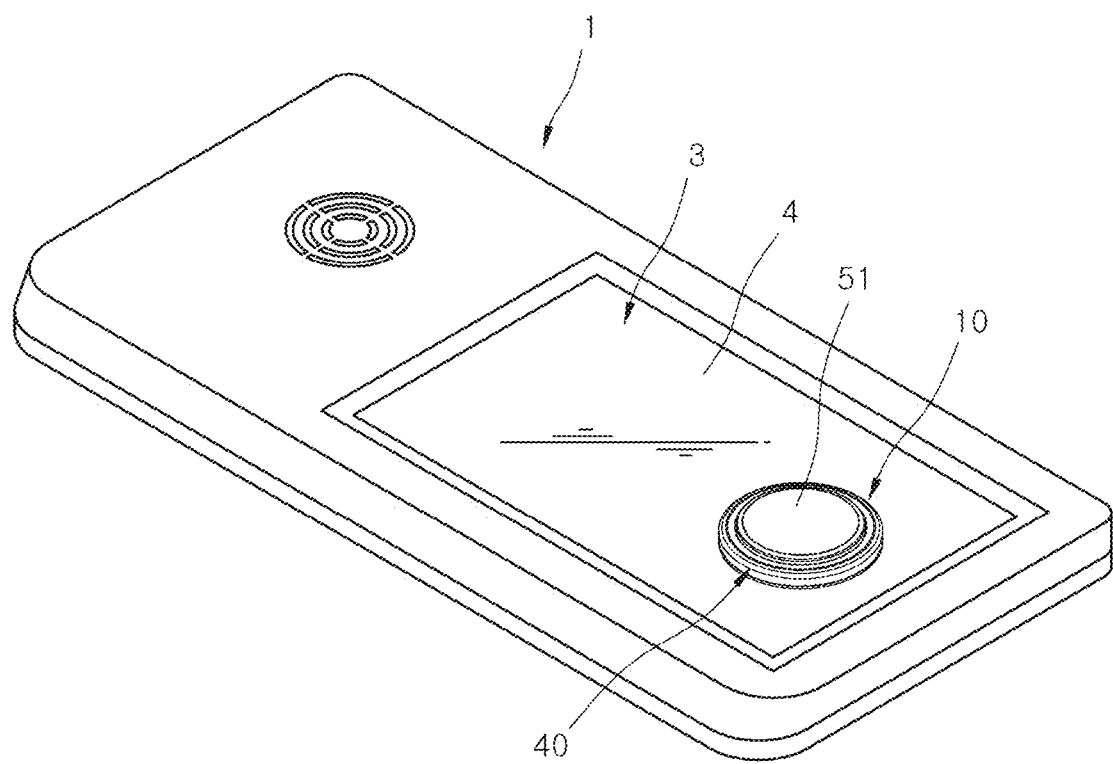
FIG. 1 is a perspective view illustrating an electronic device according to an embodiment of the present invention.

FIG. 1 is a perspective view illustrating an electronic device according to an embodiment of the present invention. Referring to FIG. 1, an electronic device 1 according to the embodiment of the present invention may be an electronic device equipped with a touch screen 3 and may particularly be a smart pad. However, the electronic device to which embodiments of the present invention is applied is not limited to the smart pad, and embodiments of the present invention may be applied even to, for example, portable electronic devices, such as smart phones and laptop computers, and game-dedicated electronic devices such as slot machines.

The touch screen 3 is provided with a display panel, a touch detecting unit, and a protective glass. The display panel is a device on which a still image or moving images are displayed. The touch detecting unit detects a touch at a specific point when a user comes into contact with the specific point and is installed to overlap the display panel.

The touch detecting unit may be a capacitive touch detecting unit and may be a touch film that is thinner and more flexible than the touch panel. The touch detecting unit is provided with a plurality of touch detecting electrodes 6 (see FIG. 6) that extend in a horizontal direction to be spaced apart from each other and a plurality of second touch detecting electrodes 7 (see FIG. 6) that extend in a vertical direction to be spaced apart from each other. The first and second touch detecting electrodes may be made of transparent indium tin oxide (ITO). The protective glass 4 is installed to overlap the touch detecting unit. In other words, the first and second touch detecting electrodes 6 and 7 are located below the protective glass 4.

Figure 2:
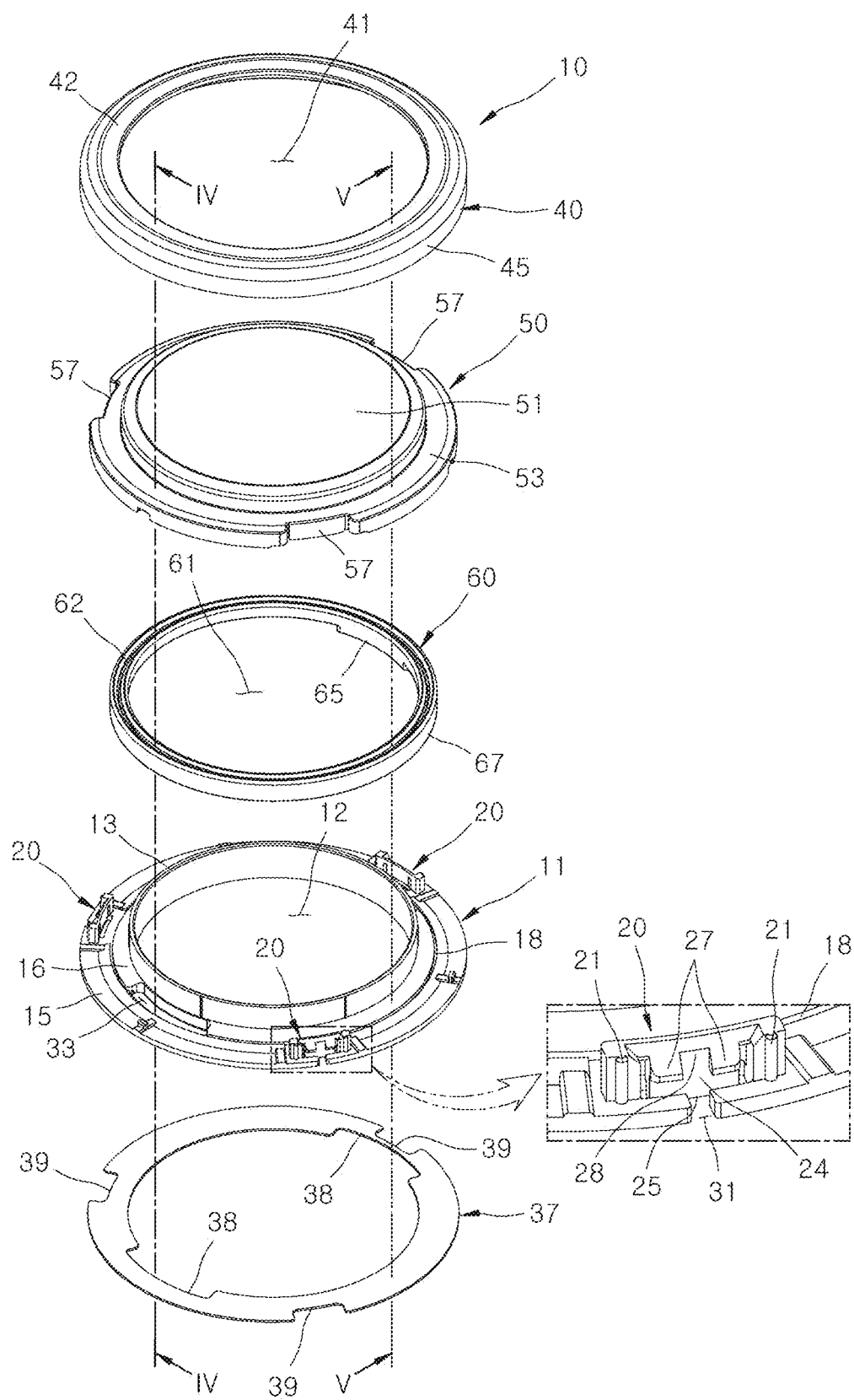
FIG. 2 is an exploded perspective view of a touch screen-attached button device of FIG. 1 from above.
Figure 3:
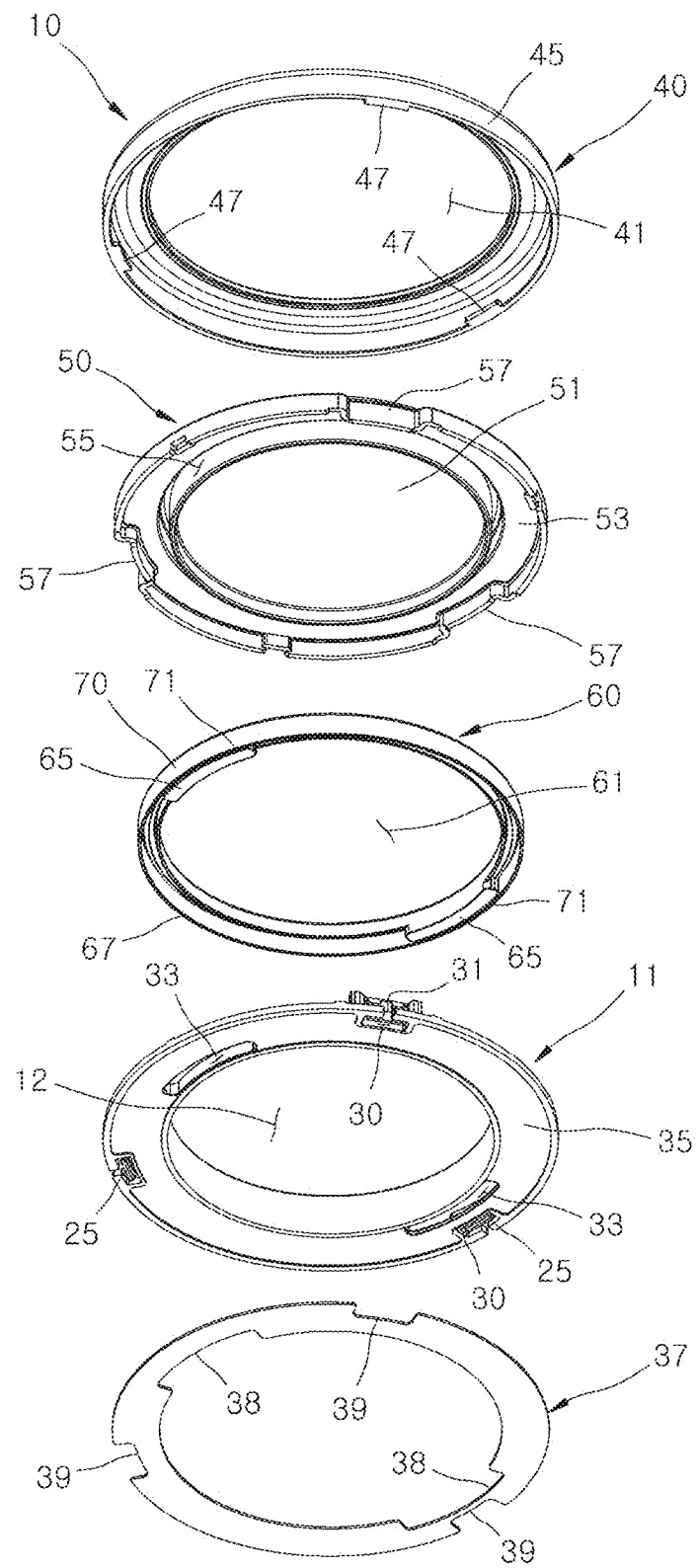
FIG. 3 is an exploded perspective view of the touch screen-attached button device of FIG. 1 from below.
Figure 4:
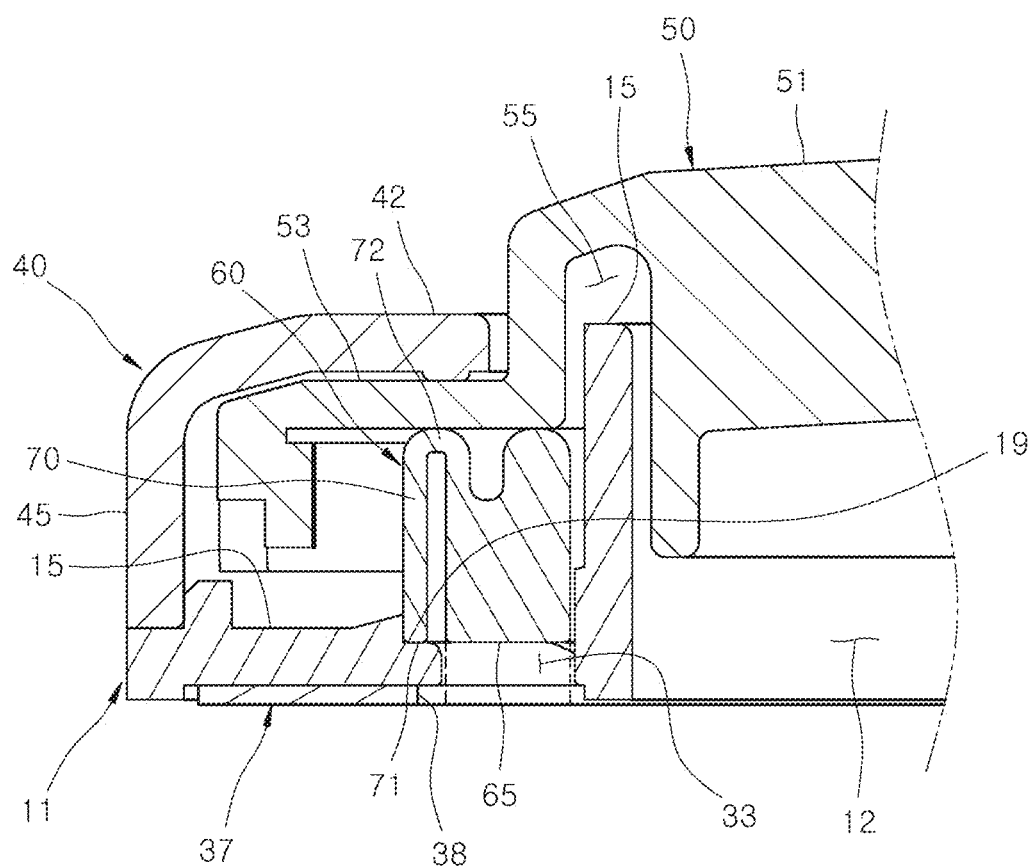
FIG. 4 is a cross-sectional view along line IV-IV of FIG. 2.
Figure 5:
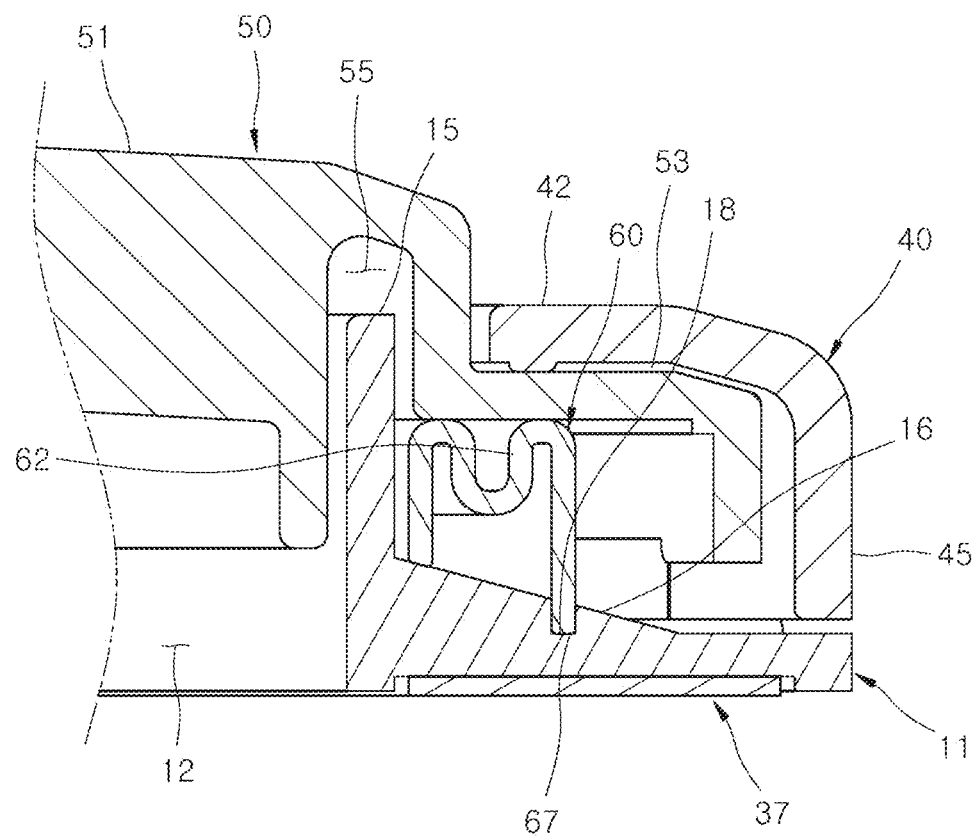
FIG. 5 is a cross-sectional view along line V-V of FIG. 2.

FIG. 2 is an exploded perspective view of a touch screen-attached button device of FIG. 1 from above, FIG. 3 is an exploded perspective view of the touch screen-attached button device of FIG. 1 from below, FIG. 4 is a cross-sectional view along line IV-IV of FIG. 2, and FIG. 5 is a cross-sectional view along line V-V of FIG. 2.

Referring to FIGS. 2 to 5 together, a touch screen-attached button device 10, which is a means for a user to quickly and intuitively input a specific instruction while using the electronic device 1, is provided with a base 11, a push button 50, a bezel 40, a conductive elastomer 60, and a double-sided adhesive tape 37.

The base 11 is fixedly adhered to a surface of the touch screen 3, particularly, an upper surface of the protective glass 4. In the embodiment of the present invention, the base 11 may be detachably attached to the protective glass 4 by the double-sided adhesive tape 37 or may be attached to the protective glass 4 by other means such as an adhesive.

The base 11, which is a generally ring-shaped member having a hollow 12, is provided with a button elevator guide protrusion 13 that limits the hollow 12 and protrudes upward, an inclined part 16 that is connected to an outer side of the button elevator guide protrusion 13 and is inclined such that an upper surface thereof is lowered from a center toward an edge, a flat part 15 that is flatly connected to an outer side of the inclined part 16, and a plurality of hooks 20 that protrude upward and are covered by the bezel 40.

The hooks 20 are each provided with a pair of pillar parts 21 that protrude upward from the flat part 15 and are spaced apart from each other, a body part 24 of which one end and the other end in a longitudinal direction are connected to the pair of pillar parts 21, and a triangular protrusion 27 that is formed at an upper end of the body part 24 and protrudes outward from the body part 24 in a stepped manner. The triangular protrusion 27 has a lower stepped surface that protrudes outward in a stepped manner from an outer surface of the body part 24 and an upper inclined surface that extends upward to be inclined from an upper side of the lower stepped surface.

A length of the body part 24, which is perpendicular to a height of the body part 24 in the vertical direction, is greater than the height. A thickness of the body part 24 except for the triangular protrusion 27 is smaller than the length and the height of the body part 24. A thickness of the pillar part 21 is greater than the thickness of the body part 24. A lower end of the pillar part 21 is connected to the flat part 15, but a lower end 25 of the body part 24 is separately spaced apart from the flat part 15.

In detail, a hook gap slot 30 is formed in the flat part 15 such that the lower end 25 of the body part 24 is spaced apart from the flat part 15 with a gap therebetween. With this configuration of the hook 20, when the triangular protrusion 27 or the body part 24 is pressed in a direction from the outside of the base 11 toward the hollow 12, the body part 24 may be easily elastically deformed in a direction wherein the body part 24 is pressed, and when a pressing force is released, the body part 24 may be easily restored to an original shape thereof.

A disassembly slot 31 that extends from an outer peripheral boundary thereof to the hook gap slot 30 and is connected to the hook gap slot 30 is formed in the flat part 15. In an embodiment, a tool such as a pin may be input from the outside of the base 11 through the disassembly slot 31 and may press the hook 20 such that the hook 20, particularly, the body part 24, is easily elastically deformed.

In each of the hooks 20, the triangular protrusion 27 is not connected to and spaced part from the pair of pillar parts 21, and a dent 28 recessed to not protrude is formed in a central portion of the triangular protrusion 27. Accordingly, when the triangular protrusion 27 or the body part 24 is pressed in a direction from the outside of the flat part 15 toward the hollow 12, the body part 24 is elastically deformed with a greater displacement in a direction wherein the body part 24 is pressed, and when a pressing force is released, the body part 24 may be easily restored to an original shape thereof.

The push button 50 overlaps the base 11 and is disposed to move vertically with respect to the base 11. The push button 50 is located to be vertically aligned with the hollow 12 of the base 11 and is provided with a central part 51 through which an image displayed on the display panel is viewed and a flange part 53 that extends outward from an outer boundary of the central part 51 in a stepped manner.

A plurality of hook avoidance dents 57 recessed inward to avoid the plurality of hooks 20 are formed at an outer boundary of the flange part 53. The central part 51 may be provided with a lens that enlarges or reduces the image of the display panel, which is exposed through the hollow 12, or a filter that provides a visual effect to the image.

An elevator guide groove 55 into which the button elevator guide protrusion 13 fits is formed in a lower surface of the push button 50. Accordingly, when the user presses the push button 50 so that the push button 50 is lowered with respect to the base 11 and then the push button 50 is raised and returned to an original state thereof, a state wherein the central part 51 is aligned with the hollow 12 is maintained.

The bezel 40 is a ring-shaped member wherein a hollow 41 corresponding to the central part 51 is formed so that the central part 51 of the push button 50 is exposed. The bezel 40 is covered on the push button 50 to expose the central part 51 of the push button 50 and hide the flange part 53 and is detachably coupled to the base 11.

The bezel 40 has an inner peripheral part 42 that limits the hollow 41 thereof, an outer peripheral part 45 that is bent and extend downward from the inner peripheral part 42, and a plurality of interference protrusions 47 that are bent and protrude inward from a lower end of the outer peripheral part 45 and are provided in the plurality of hooks 20 in one-to-one correspondence. The plurality of interference protrusions 47 mutually interfere with the plurality of hooks 20 so that bezel 40 is prevented from being unintentionally separated from the base 11 when the bezel 40 is covered by the push button 50.

When the bezel 40 is coupled to the base 11, an operator pushes the bezel 40 downward toward the base 11 to approach the base 11 in a state wherein the plurality of interference protrusions 47 and the plurality of hooks 20 are aligned vertically. Then, the plurality of interference protrusions 47 press upper inclined surfaces of the triangular protrusions 27 of the plurality of hooks 20 while in contact with the upper inclined surfaces, the body part 24 of the hook 20 is retreated inward, that is, toward the hollow 12, within the hook gap slot 30 due to the pressing force, and the plurality of interference protrusions 47 are lowered to a lower level than the triangular protrusion 27.

Accordingly, when the pressing force of the interference protrusion 47 is not applied to the triangular protrusion 27, the body part 24 is elastically restored to an original position thereof and thus the base 11 and the bezel 40 are fastened to each other. In this state, even when the bezel 40 is pulled upward, the interference protrusion is blocked by a lower stepped surface of the triangular protrusion 27, and thus the bezel 40 is not separated from the base 11. When the bezel 40 coupled to the base 11 is separated from the base 11, a disassembly tool designed to simultaneously press the plurality of hooks 20 may be used.

The conductive elastomer 60, which is a generally ring-shaped member extending along a closed curve path to form a hollow 61, is interposed between the base 11 and the flange part 53 of the push button 50 and elastically supports the push button 50 in an upward direction. The conductive elastomer 60 is made of an elastic material.

In detail, the conductive elastomer 60 may include, for example, an elastic substrate that contains rubber such as a silicone rubber and a metal powder that is evenly dispersed in the elastic substrate.

When the user presses the push button 50, the conductive elastomer 60 is elastically compressed, and when a pressing force of the user is released, the conductive elastomer 60 is elastically restored, and thus the push button 50 is raised to an original position thereof.

The conductive elastomer 60 is provided with a wrinkle part 62 having a cross section extending along a zigzag path in a width direction thereof. Accordingly, when the push button 50 is pressed, an elastically restorable stroke distance may increases, and a strong elastic restoration force may be reliably maintained.

The conductive elastomer 60 is provided with a pair of downward protrusions 65 that protrude downward toward the touch screen 3. The downward protrusions 65 are spaced apart from each other at intervals of 180° based on a center of the conductive elastomer 60. A pair of downward protrusion through-holes 33 into which the pair of downward protrusions 65 fit are formed in the base 11.

When the push button 50 is pressed downward by the user, the conductive elastomer 60 is pressed downward by the push button 50, and accordingly, the pair of downward protrusions 65 pass through the pair of downward protrusion through-holes 33 and come into contact with the surface of the touch screen 3, specifically, the upper surface of the protective glass 4 (see FIG. 1).

A capacitance of a material increases in proportion to a dielectric constant of the material and a volume of the conductive elastomer 60. Since the conductive elastomer 60 extends along a closed curved path and has a height in the vertical direction and a width in the horizontal direction that are sufficient to allow the push button 50 to be elastically restored, an electrostatic capacity of the conductive elastomer 60 itself is sufficiently large.

Thus, when the user presses the push button 50 so that the pair of downward protrusions 65 come into contact with the upper surface of the protective glass 4, electrostatic energy resulting from the capacitance of the conductive elastomer 60 passes through the protective glass 4 and is transmitted to the touch detecting unit of the touch screen 3, specifically, to the first and second touch detecting electrodes 6 and 7. As a result, when the user presses the push button 50, an intended specific instruction is input to the electronic device 1 through the touch screen-attached button device 10.

The touch screen-attached button device 10 is configured to transmit the electrostatic energy resulting from the capacitance of the conductive elastomer 60 itself to the touch detecting unit, and thus even when the user presses the push button 50 with a hand wearing a non-conductive glove or presses the push button 50 using a non-conductive tool, the touch detecting unit may detect this pressing, and a specific instruction may be input to the electronic device 1.

An outer lower end 67 of the conductive elastomer 60 in the width direction is fixedly fitted onto the inclined part 16 of the base 11. In detail, the outer lower end 67 is fixedly fitted into a fitting slot 18 recessed in the inclined part 16 of the base 11 in a stepped manner. The conductive elastomer 60 is further provided with an outer end wall part 70 spaced apart from the downward protrusion 65 in the width direction thereof and a connection part 72 connecting the downward protrusion 65 and an upper end of the outer end wall part 70. A lower end 71 of the outer end wall part 70 is fixedly fitted into a support groove 19 formed around the pair of downward protrusion through-holes 33 of the base 11 in a stepped manner.

The fitting slot 18 and the support groove 19 also extend in a closed curve line along the inclined part 16 of the base 11 without disconnection, and the outer lower end 67 of the conductive elastomer 60 and the lower end 71 of the outer end wall part 70 that fit into the fitting slot 18 and the support groove 19 and are in contact with the inclined part 16 are connected without disconnection. Further, the flange part 53 of the push button 50 covers the inclined part 16 and the conductive elastomer 60 in an overlapping manner and is connected to the central part 51.

Therefore, even when liquid foreign substances are poured onto the touch screen-attached button device 10 due to carelessness of the user and the liquid foreign substances flow into a gap between the central part 51 of the push button 50 and the hollow 41 of the bezel 40, the liquid foreign substances flow between the flange part 53 and the outer peripheral part 45 of the bezel 40, is discharged through a gap between a lower end of the outer peripheral part 45 of the bezel 40 and an outer peripheral boundary of the base 11, and cannot flow toward the hollow 12 of the base 11. This is because liquid flows downward along the inclined part 16 and inflow of the liquid is blocked by the outer lower end 67 of the conductive elastomer 60 and the lower end 71 of the outer end wall part 70.

The double-sided adhesive tape 37 is a medium for fixedly adhering the base 11 to the surface of the touch screen 3, that is, the upper surface of the protective glass 4. The double-sided adhesive tape 37 is generally cut into a ring shape to correspond to a shape of the base 11.

The double-sided adhesive tape 37 includes a pair of downward protrusion avoidance dents 38 that are recessed at an inner peripheral boundary so as not to close the pair of downward protrusion through-holes 33 and a plurality of hook avoidance dents 39 that are recessed at an outer peripheral boundary so as not to close the plurality of hook gap slots 30 and the disassembly slot 31.

Figure 6:
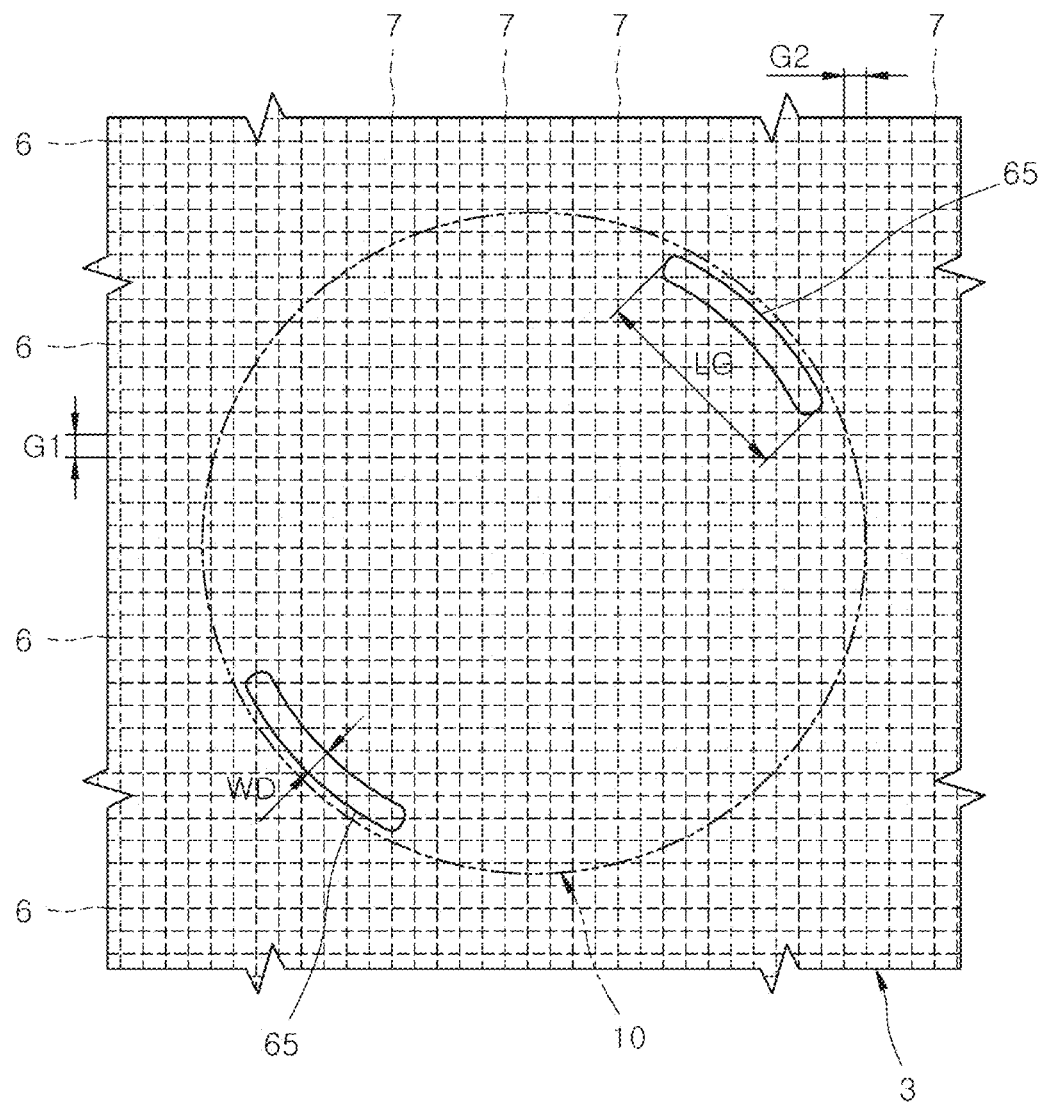
FIG. 6 is a plan view illustrating a touch screen-attached button device of FIG. 2 attached to a touch screen, which is a view illustrating an overlapping state of a downward protrusion of a conductive elastomer and a touch detecting line of the touch screen.

FIG. 6 is a plan view illustrating a touch screen-attached button device of FIG. 2 attached to a touch screen and a view illustrating an overlapping state of a downward protrusion of a conductive elastomer and a touch detecting line of the touch screen.

Referring to FIGS. 1 and 6, a first electrode gap G1 between the pair of arbitrary adjacent first touch detecting electrodes 6 of the touch screen 3 is constant, and a second electrode gap G2 between the pair of arbitrary second touch detecting electrodes 7 is constant. The downward protrusion 65 may extend along a curved path with a constant width WD.

In the electronic device 1 of embodiments of the present invention, the smaller one of a length LG and the width WD of the downward protrusion 65 may be greater in size than the larger one of the first electrode gap G1 and the second electrode gap G2. In the case of the above relationship, even when the touch screen-attached button device 10 is attached to the upper surface of the protective glass 4 at any angles, the downward protrusion 65 is disposed to overlap at least one detecting point among a plurality of detecting points at which the plurality of first touch detecting electrodes 6 and the plurality of second touch detecting electrodes 7 intersect each other. Therefore, a state wherein the push button 50 is pressed may be reliably detected by the touch screen 3.

In the touch screen-attached button device 10, a function of transmitting an instruction of the user to the touch screen 3 through the pressing of the push button 50 and a function of elastically supporting the push button 50 are performed by the conductive elastomer 60 that is one component. Thus, a structure of the touch screen-attached button device 10 is simple, and thus the reliability of operation is improved, the possibility of failure such as malfunction is reduced, and product costs are reduced.

In the touch screen-attached button device 10, the conductive elastomer 60 is fitted onto the inclined part 16 of the base 11, and thus even when the liquid foreign substances penetrate into the touch screen-attached button device 10, the liquid foreign substances do not remain therein, are easily discharged to the outside, and do not flow into the hollow 12 of the base 11 or the downward protrusion through-hole 33. Thus, a problem that operation failures occur due to the penetration of the liquid foreign substances or an image viewed through the central part 51 of the push button 50 is blocked does not occur.

Since the electronic device 1 of embodiments of the present invention is provided with the touch screen-attached button device 10 that is fixedly adhered to the surface of the protective glass 4 without damaging the protective glass 4 of the touch screen 3, assembly costs for installing the button device on the touch screen are reduced, and an assembly time therefor is shortened. Further, since the liquid foreign substances do not flow into the electronic device through a damaged part of the protective glass, internal contamination of the electronic device or malfunction resulting therefrom are prevented.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A touch screen-attached button device comprising:
   a base fixed to a surface of a touch screen;
   a push button overlapping the base, disposed to move vertically with respect to the base, and including a central part and a flange part extending from an outer boundary of the central part in a stepped manner;
   a bezel covered on the push button such that the central part is exposed and the flange part is covered and detachably coupled to the base; and
   a conductive elastomer made of a conductive elastic material, elastically supporting the push button in an upward direction while interposed between the base and the flange part of the push button, and having a downward protrusion protruding downward toward the touch screen,
   wherein a downward protrusion through-hole into which the downward protrusion fits is formed in the base, and
   when the push button is pressed downward, the conductive elastomer is pressed downward, and thus the downward protrusion passes through the downward protrusion through-hole and comes into contact with the surface of the touch screen;
   wherein the base is provided with a plurality of hooks protruding upward, and
   the bezel is provided with a plurality of interference protrusions mutually interfering with the plurality of hooks such that the bezel is not separated from the base when covered on the push button.

2. The touch screen-attached button device of claim 1, wherein the conductive elastomer extends along a closed curved path.

3. The touch screen-attached button device of claim 1, wherein the conductive elastomer is provided with a wrinkle part having a cross section extending along a zigzag path.

4. The touch screen-attached button device of claim 1, wherein the base is provided with an inclined part of which an upper surface is obliquely lowered from a center toward an edge, and
   an outer lower end of the conductive elastomer in a width direction fixedly fits onto the inclined part.

5. The touch screen-attached button device of claim 1, wherein the conductive elastomer is provided with an outer end wall part spaced apart from the downward protrusion in a width direction and a connection part connecting the downward protrusion and an upper end of the outer end wall part,
   a support groove is formed around the downward protrusion through-hole of the base in a stepped manner, and
   a lower end of the outer end wall part fixedly fits into the support groove.

6. The touch screen-attached button device of claim 1, wherein the base is fixedly adhered to the surface of the touch screen by a double-sided adhesive tape, and
   an avoidance dent recessed to not close the downward protrusion through-hole is formed in the double-sided adhesive tape.

7. The touch screen-attached button device of claim 1, wherein the conductive elastomer includes an elastic substrate containing rubber and a metal powder dispersed in the elastic substrate.

8. An electronic device comprising:
   a touch screen including a protective glass, a plurality of first touch detecting electrodes located below the protective glass and extending in a horizontal direction to be spaced apart from each other, and a plurality of second touch detecting electrodes located below the protective glass and extending in a vertical direction to be spaced apart from each other; and
   a touch screen-attached button device attached to an upper surface of the protective glass of the touch screen,
   wherein the touch screen-attached button device includes:
   a base fixed to a surface of the touch screen;
   a push button overlapping the base, disposed to move vertically with respect to the base, and including a central part and a flange part extending from an outer boundary of the central part in a stepped manner;
   a bezel covered on the push button such that the central part is exposed and the flange part is covered and detachably coupled to the base; and
   a conductive elastomer made of a conductive elastic material, elastically supporting the push button in an upward direction while interposed between the base and the flange part of the push button, and having a downward protrusion protruding downward toward the touch screen,
   a downward protrusion through-hole into which the downward protrusion fits is formed in the base, and
   when the push button is pressed downward, the conductive elastomer is pressed downward, and thus the downward protrusion passes through the downward protrusion through-hole and comes into contact with the surface of the touch screen;
   wherein a smaller one of a length and a width of the downward protrusion is greater in size than a larger one of a gap between a pair of adjacent first touch detecting electrodes and a gap between a pair of adjacent second touch detecting electrodes.

9. A touch screen-attached button device comprising:
   a base fixed to a surface of a touch screen;
   a push button overlapping the base, disposed to move vertically with respect to the base, and including a central part and a flange part extending from an outer boundary of the central part in a stepped manner;
   a bezel covered on the push button such that the central part is exposed and the flange part is covered and detachably coupled to the base; and
   a conductive elastomer made of a conductive elastic material, elastically supporting the push button in an upward direction while interposed between the base and the flange part of the push button, and having a downward protrusion protruding downward toward the touch screen, wherein a downward protrusion through-hole into which the downward protrusion fits is formed in the base, and when the push button is pressed downward, the conductive elastomer is pressed downward, and thus the downward protrusion passes through the downward protrusion through-hole and comes into contact with the surface of the touch screen;

wherein the conductive elastomer includes an elastic substrate containing rubber and a metal powder dispersed in the elastic substrate.

\* \* \* \* \*